United States Patent Office 3,639,369
Patented Feb. 1, 1972

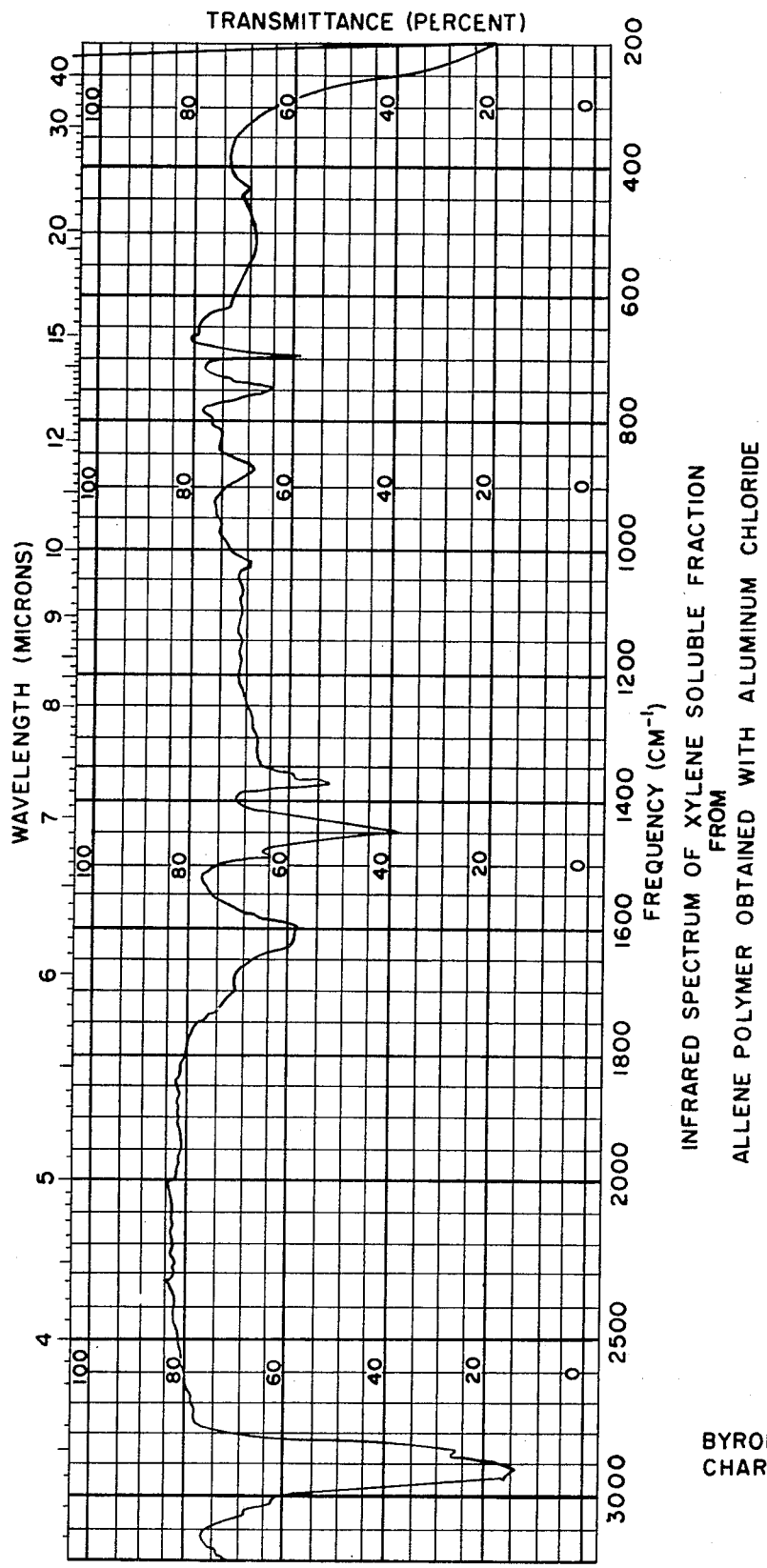

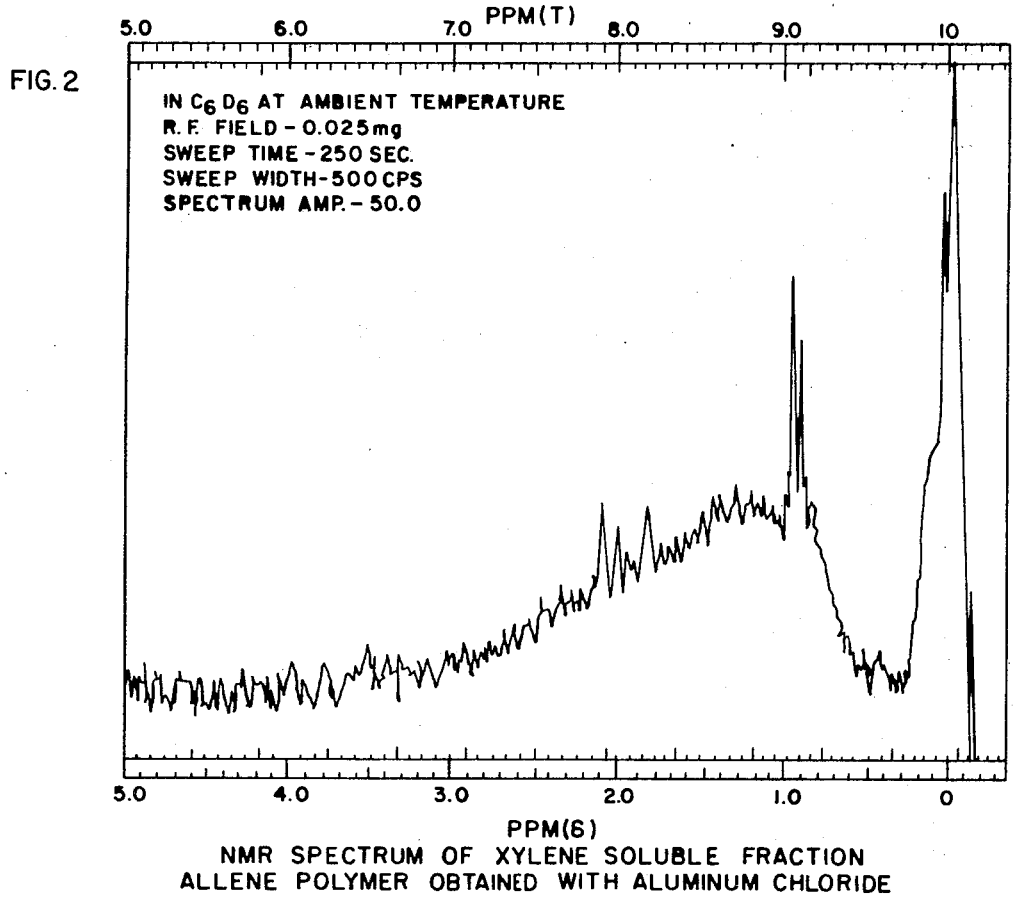
FIG. 2 NMR SPECTRUM OF XYLENE SOLUBLE FRACTION ALLENE POLYMER OBTAINED WITH ALUMINUM CHLORIDE
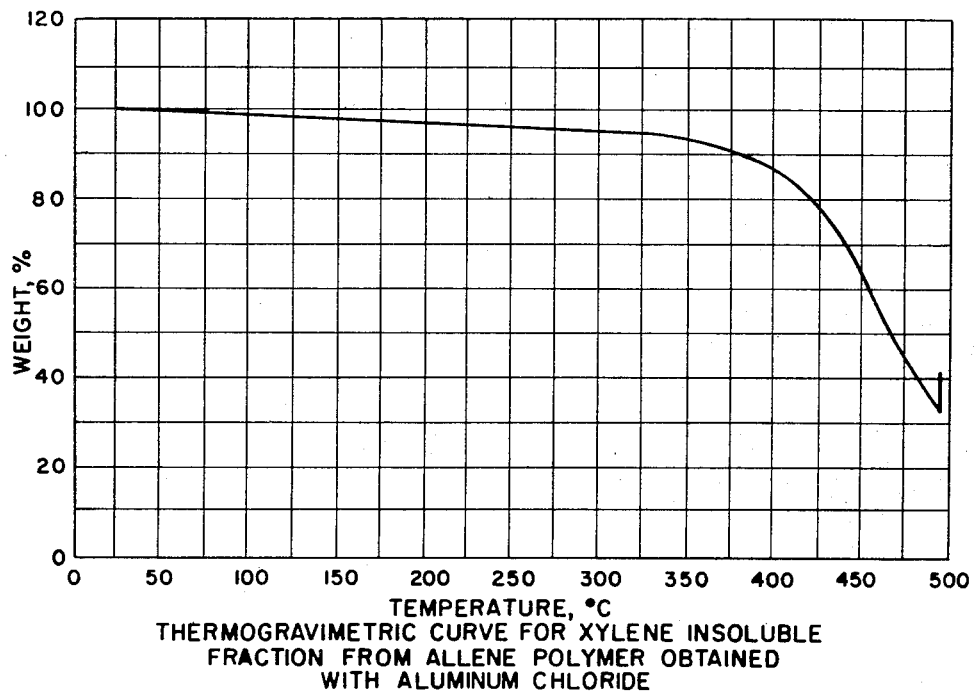
FIG. 3 THERMOGRAVIMETRIC CURVE FOR XYLENE INSOLUBLE FRACTION FROM ALLENE POLYMER OBTAINED WITH ALUMINUM CHLORIDE

---

3,639,369
ALLENE POLYMERIZATION AND DERIVATIVES
Charles J. Norton, Berkeley, Calif., and Byron C. Diehl, Indian Hills, Colo., assignors to Marathon Oil Company, Findlay, Ohio
Filed Sept. 30, 1968, Ser. No. 763,638
Int. Cl. C08f 15/40
U.S. Cl. 260—88.2
9 Claims

ABSTRACT OF THE DISCLOSURE

Polymers having molecular weights above 250 are produced by contacting an organic cumulene compound having the following structure:

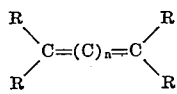

with a Lewis acid at about $-50°$ to $500°$ C. R can be aryl, alkyl, aralkyl, cycloalkyl, alkenyl, alkynes, halides, and hydrogen. and the R's may be the same or different, and $n$ is from about 1 to about 20. The polymer contains from about 1.0 to about 1.33 moles of hydrogen per mole of carbon, is resinous and useful, inter alia, in formulations of paints, varnishes, plasticizers, binding agents, and as intermediates in the formation of ion exchange resins.

BACKGROUND OF THE INVENTION

This invention relates to the polymerization of allene and cumulene homologs thereof by catalytic initiation. In particular, it relates to the formation of high molecular weight polymers from allene and its homologs by contact with Lewis acid catalysts.

It has long been known that allene will polymerize under thermal polymerization conditions. S. V. Lebedev (see, for instance, Zhur. Russ Fiz.-Khim. Obshch, 45, 1249 (1913); and Fenselau, A. H., The Oligomers of Allene, Ph.D. Thesis, Standard University [1964]) examined the thermal polymerization of allene and reported a variety of unsaturated liquid hydrocarbon products which were of the low molecular weight oligomer type such as dimers, trimers, tetramers, and pentamers. In these experiments, what was thought to be a 25% yield of high molecular weight polymer was later found to be a mixture of 1,2- and 1,3-dimethylene cyclobutene. It was reported in the above cited references that the conversions were poor and the temperature and time requirements were stringent.

Allene has also been polymerized and copolymerized by catalysis with peroxide and other free radical initiators, alkali metals, and Ziegler catalysts. The products formed by these reactions have generally been in the oligomer molecular weight range and have not been produced in substantial yields.

SUMMARY OF THE INVENTION

Allene and cumulene homologs thereof are polymerized in accordance with this invention by contact with a catalytic amount of a Lewis acid under controlled conditions of temperature, pressure, and reaction time to form polymers having molecular weights in excess of 250. Preferably, allene can be polymerized with a Friedel-Crafts catalyst to form a resinous polymer with a molecular weight in excess of 1800 with an excellent conversion of reacted allene to polymer product (Example 1). The polymers produced contain anywhere from one mole of hydrogen per mole of carbon to 1.33 moles of hydrogen per mole of carbon.

The process of this invention overcomes the apparent problem with forming higher molecular weight polymers from allene exhibted by the art. Furthermore, this method effectively produces useful polymers in high conversions.

The resinous polymer products formed are useful in formulations of paints, varnishes, plasticizers, and binding agents. There are numerous other utilities for these products which will become apparent to those skilled in the art upon a reading of this specification, an example of which would be to further react the resinous polymers with sulfuric acid to make sulfonic acid resins useful as ion exchange resins.

BRIEF DESCRIPTION OF THE DRAWINGS

These drawings further particularize the polymer products formed in accordance with this invention and the examples to follow hereafter.

FIG. 1 is the infra-red spectrum of a xylene soluble fraction allene polymer obtained by catalysis with aluminum chloride.

FIG. 2 shows the nuclear magnetic resonance (NMR) spectra analysis of the same product characterized in FIG. 1.

FIG. 3 is the thermogravimetric characterization of the same polymer under inert atmosphere.

PREFERRED EMBODIMENTS OF THE INVENTION

The organic compound starting materials having utility in the instant process are typified by the following structure:

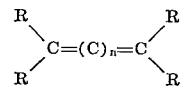

where R may be straight or branch chained alkyl or cycloalkyl such as methyl, ethyl, propyl, isopropyl, butyl, isobutyl, amyl, isoamyl, cyclopentyl, octyl, isoctyl, dodecyl, tetradecyl, hexadecyl, octadecyl, and the like, wherein R contains preferably from about 1 to 20 and more preferably from 1 to 8 carbon atoms; an aromatic including aryl and aralkyl exemplified by phenyl, tolyl, xylyl, p-nitrophenyl, p-chlorophenyl, p-methoxyphenyl, p-ethoxyphenyl, naphthyl, 4-nitronaphthyl, benzyl, paranitrobenzyl, m-nitrobenzyl, p-methoxybenzyl, p-ethoxybenzyl, p-chlorobenzyl, naphthobenzyl, 4-nitronaphthabenzyl, 4-methoxynaphthobenzyl, and the like wherein there are preferably from about 1 to 20 and more preferably from 1 to 8 carbon atoms. R may also be an alkyne, such as ethyne, methylacetylene, 1-butyne, and the like; and halides including fluorides, chlorides, bromides, and iodides. R may also be alkenyl such as vinyl, allyl, butenyl, hexenyl, and the like. But the most preferred R's are lower alkyl such as methyl and even more preferred is hydrogen. The R substituents may be the same, or different. $n$ is an integer preferably from 1 to about 20 and more preferably from 1 to about 8. For example, when R equals H and $n=2$, the compound is butatriene. The most preferred organic compound starting material is allene (propadiene), with $n=1$. In general, it is only critical that R be a noninterfering substituent with respect to the catalytic polymerization reaction.

Streams containing allene or its cumulene homologs where the substituents are noninterfering with respect to the polymerization reaction, may be used. An example is MAPP gas, the trademark name of a fuel introduced by the Dow Chemical Company which basically comprises a mixture of methyl acetylene, allene, propane, and propylene, or similar compositions. It is generally produced by cracking propylene or isobutylene or their mixtures. MAPP gas is readily available from ordinary hydrocarbon cracking operations and there has been considerable effort to find economical uses for this gas cut. Since methylacetylene polymerizes to some extent under the reaction conditions of this invention, a stream containing allene and methylacetylene, such as MAPP gas, is useful as a starting material.

The catalyst utilized in this process is an acid selected from the group known as Lewis acids, which are defined as electron acceptors, that is, acid molecules which can form an octet by accepting electrons. Examples are $P_2O_5$, $CuP_2O_7$, and such mineral acids as $H_2SO_4$, $H_3PO_4$, HF, HCl, but most preferably, Friedel-Crafts catalysts including halides of aluminum, boron, tin, titanium, zirconium, and antimony, exemplified by aluminum chloride, iron chloride, stanous chloride, boron trifluoride, and zinc chloride, listed in their order of decreasing potency and preference. The Friedel-Crafts catalysts have been found to be especially effective in polymerizing substituted or unsubstituted allene or its cumulene homologs. Most preferably, the Friedel-Crafts catalyst utilized contains small amounts of moisture or HCl, the amount of which is preferably less than 0.1 mole percent. A completely anhydrous Friedel-Crafts catalyst appears to be less effective than those catalysts containing such small amounts of moisture.

Dried clays or clays treated with mineral acids and related oxide systems are additionally useful as catalysts and fall within the Lewis acid category, exemplified by silica dioxide-aluminum oxide, silica dioxide-zirconium oxide, silica dioxide-magnesium oxide, fuller's earth, and activated clay. Combinations of the above enumerated catalysts may conceivably be used also. Fixed bed catalyst systems may also be employed, exemplified by SK-500 molecular sieves manufactured by the Norton Co., 10X molecular sieves manufactured by the Union Carbide Corp., silicon aluminum, bentonite, silica gel, or various other catalysts on an inert catalyst support. The support or carrier should be a base, support, carrier, or binder for the active Lewis acid constituent but which, by itself, has little, if any, catalytic activity. The catalyst to be used can be impregnated or precipitated or attached by some other method known to those skilled in the art, on the carrier. In general, the catalyst will be in the form of granules, rings, or pellets. In general, the support material must be able to maintain its mechanical strength under the conditions of the reaction.

The amount of catalyst will, in general, vary with the starting material organic compound. It is also dependent upon the strength of the catalyst used. But, in general, there will be less than about 10.0 mole percent catalyst based on the allene or cumulene homolog charged in the reaction mixture. More preferably, there will be less than about 5 mole percent catalyst based on the starting material charged in the reaction mixture.

In general, use of a solvent is preferred, since it keeps the catalyst surface dispersed and functions to dissolve some of the foreign polymer off the surface to keep the catalyst clean and active. It further functions as a means of controlling the heat transfer of the system. The solvents should dissolve the organic cumulene homolog or allene charged. Thus, although a solvent is not necessary for this reaction, it enhances the rate of reaction, decreasing reaction time. Useful solvents in this regard include benzene, toluene, xylene, and inert paraffins. Benzene is preferred. Preferred solvents are those which are easily recovered, as for example, by distillation. The amount of solvent reaction media charged is in general preferably from about 1 to about 100 and more preferably from about 5 to about 20 volumes of solvent per volume of organic compound charged.

The temperature of reaction in the present invention is not narrowly critical and ambient temperatures may be used advantageously and in general a reaction temperature of from about —50° to about 500° C. is preferable; from 50° to 250° C. is more preferred, and most preferred is from about 100° to about 200° C. The temperature, of course, will in general be dependent upon the pressure so that a high pressure will allow the reaction temperature to be lower to obtain the same result. The temperature will also be a function of the activity both of the starting organic compounds, feed, and the catalyst utilized, along with the solvent.

This reaction is preferably carried out under pressures ranging from sub-atmospheric up to about 2000 atmospheres, and more preferably in the range of from 150 p.s.i.a. to 900 p.s.i.a., and most preferably in the range of 200 to about 250 p.s.i.a For the most part, the pressure is not narrowly critical, although generally superatmospheric pressures result from the pressure of the solvent. As the allene polymerizes its partial pressure decreases. Again, pressure will be a function of temperature in that an increase in temperature may allow one to run the reaction with nearly the same results at lower pressures.

In general, the reaction time will be from about 0.01 hours to about 100 hours, although the reaction times of from 0.1 hours to 10 hours are more preferred. Time of reaction will be a function of the catalyst activity, along with the particular organic compound charged, solvent, temperature and pressure conditions, etc.

The following examples are illustrative of the preferred embodiments of this invention but are not meant to limit it in any way.

Example 1 gives the results of the polymerization of allene with aluminum chloride, the preferred catalyst in this invention. Examples 2 and 3 describe the preparation of the polymers of this invention using a Linde SK-500 molecular sieve as the catalyst. Example 4 illustrates the noncatalytic thermal polymerization of allene. The results of these experiments are summarized in Table I.

TABLE I.—ALLENE POLYMERS

| Example Number | Materials charged | Temp./time | Weight collected precipitate | Extraction $CH_3OH$, precipitate weight | Allene recovered, percent of that charged | Polymer by IR |
|---|---|---|---|---|---|---|
| 1 | Allene and benzene, $AlCl_3$ | 150° C./20 hours | 5.83 | 0.92 g | 47 | Yes. |
| 2 | Allene and SK-500 | 150° C./20 hours | Mol. sieves are 5.2 g. heavier | 0.12 g | 85 | Yes. |
| 3 | Allene $C_2H_4$ | 150° C./20.5 hours | Mol sieves are 3.2 g. heavier | Not weighed | 55 | Yes. |
| 4 | Allene | 150° C./17.5 hours | Slight amount | | | |

EXAMPLE 1

To a 300 ml. stainless steel autoclave are charged 2.0 gms. aluminum chloride, 78.0 gms. benzene (dried over calcium hydride), and 20.6 gms. allene. The autoclave is sealed with a head containing a pressure gauge and thermal control device, placed in a rocking apparatus, and heated at 150° C. for 20 hours. Over this period of time, at 150° C., the pressure drops from 240 p.s.i.g. to 205 p.s.i.g. after going through a maximum of 270 p.s.i.g. The reaction is stopped, autoclave cooled, and connected to a Dry Ice trap where gas is let off in which 9.6 gms. allene is trapped. The benzene suspension is filtered and dried at 80° C. at —25 p.s.i.g. vacuum overnight, yielding 10.25 gms. total solids consisting of a brown resin plus aluminum salt. This is treated by washing with 10% aqueous hydrochloric acid (to hydrolyze any residual aluminum chloride), filtered, rinsed, and redried in vacuum. The dried total product is extracted in a Soxhlet extractor with refluxing xylene for 40 hours, leaving 5.83 grams of insoluble brown resin on a thimble. This material left unextracted by the xylene will be designated as product 1. The xylene fraction is concentrated (xylene stripped off), and poured into 150 mls. of methanol. A white precipitate forms. This precipitate is collected (0.92 gms.) and will be designated as product 2, both products of which will be characterized later.

EXAMPLE 2

Following basically the procedure of Example 1, to a 300 ml. stainless steel autoclave are charged 37.1 gms. allene and 10.0 gms. Linde (Union Carbide) SK–500 molecular sieves. The autoclave is sealed, and placed in a rocking apparatus and heated to 150° C. where the maximum pressure reached during the reaction is 820 p.s.i. After a reaction time of 20 hours, the bomb is cooled and the gas bled off to a Dry Ice trap where 31.6 gms. of allene is collected. The molecular sieves now weigh 15.2 gms., giving a 5.2 gm. yield of total product. The molecular sieves are now extracted continuously with ether and the ether extract concentrated and poured into 150 mls. of methanol. A white precipitate separates immediately and is collected and dried giving a yield of 0.12 gms. of product with infrared (IR) spectrum identical to product 2 of Example 1.

EXAMPLE 3

The general procedure of the previous examples is employed where 23.9 gms. of allene and 14.0 gms. of ethylene are charged to a 10.0 gms. Linde SK–500 molecular sieve. The autoclave containing this mixture is heated to 150° C. for 20.5 hours. After the reaction is cooled, gas is let off the trap 13.2 gms. of allene. The molecular sieve has now increased in weight by 3.2 gms. of total product. The molecular sieves are continuously extracted with ether and the ether extract is concentrated and poured into 150 mls. of methanol to give a small amount of precipitate similar to product 2 in Examples 1 and 2.

EXAMPLE 4

To a 300 ml. stainless steel autoclave is charged 33.2 gms. of allene. The temperature of reaction is held at 150° C. for 17.5 hours. After gas is bled from the autoclave, only a few drops of liquid remain in the autoclave. The IR spectrum of this liquid product shows that it has similar characteristics to the products 1 and 2 described in Example 1, but the product is a liquid and is of a much lower molecular weight. The thermal polymerization of allene as accomplished in this example gives products which are described in the literature as being of the low molecular weight or oligomeric variety.

The polymers produced in the above examples were characterized with respect to the two products formed, that is, the first heavier, more insoluble product and the second solvent (xylene or ether) extractable product. In the molecular sieve examples, the second product was extracted with ether rather than xylene. Nevertheless, analysis of the heavier product (product 1 in Examples 1, 2, and 3) and analysis of the soluble product (product 2 in Examples 1, 2, and 3) by IR spectra and NMR spectra show that the corresponding products were substantially identical in each of these examples. These characterizations are more fully understood by reference to the accompanying drawings which show, in FIGS. 1, 2, and 3 respectively, the infra-red spectrum of product 2 (specifically the polymer product obtained in Example 1 using aluminum chloride), the NMR spectrum of the same product 2 as analyzed in FIG. 1, and the thermogravimetric characterization of the polymer designated as product 1.

The IR spectrums of product 2 of the different examples corresponded even though different Lewis acid catalysts and solvent systems were employed. In FIG. 1, the total polymer contains a small amount of aluminum chloride in water which gives rise to the O—H band. The infra-red spectrum shows little aromatic carbon-hydrogen adsorption and strong aliphatic carbon-hydrogen adsorption. The NMR of FIG. 2 also shows little aromatic carbon-hydrogen adsorption with strong aliphatic carbon-hydrogen adsorption. The thermogravimetric characterization of the polymers shown in FIG. 3 was conducted under an inert atmosphere. As can be seen, only about 5% by weight of the polymers is lost up to 300° C. The rate of deterioration above this temperature is more marked. This characterization evidences the thermal stability of the polymers.

As shown by a Huffman elemental analysis, product 1, the higher molecular weight xylene insoluble polymer, has a hydrogen to carbon ratio of 1.32 which is very close to the theoretical polyallene hydrogen to carbon ratio of 1.33. The hydrogen to carbon ratio of product 2, the lower molecular weight xylene extractable polymer, was found to be 1.22. A molecular weight analysis was run on this latter product and it was found to have a molecular weight of about 1,825. Because of insolubility, a molecular weight analysis was not run on product 1. However, it can be inferred from the relative physical characteristics of the two products that the molecular weight of product 1 is much greater than that of product 2 (≫1825). Because of the hydrogen to carbon ratio and insolubility of product 1, it is quite likely that the polymer product has heavy cross linkage.

It should be understood that the invention is capable of a variety of modifications and variations which will be made apparent to those skilled in the art by a reading of the specification and which are to be included within the spirit of the claims appended hereto.

What is claimed is:

1. A process for the production of polymers having molecular weights above 250, said process comprising contacting a compound selected from allene and its derivatives and having the structure:

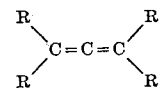

with a catalytic amount of Friedel-Crafts catalyst, $P_2O_5$, $CuP_2O_7$, $H_2SO_4$, $H_3PO_4$, HF, HCl, silica dioxide, aluminum oxide, silica dioxide-aluminum oxide, silica-dioxide-zirconium oxide, silica dioxide-magnesium oxide, fuller's earth, or activated clay or mixtures thereof at −50 to 500° C. from about 1 to about 20,000 atmospheres, from 0.01 to about 100 hours, wherein the polymer contains from about 1.0 to about 1.33 moles of hydrogen per mole of carbon, and wherein R is selected from the group consisting of 1–20 carbon atoms alkyl, hydrogen, and wherein the R's may be the same or different.

2. The process of claim 1 wherein the contacting process is carried on in the presence of a solvent selected from the group consisting of benzene, toluene, xylene, and inert paraffin.

3. The process of claim 1 wherein the allene or derivative is contacted with a Friedel-Crafts catalyst, selected from the group consisting of halides of aluminum, boron, tin, titanium, zirconium, and antimony.

4. The process of claim 1 wherein the allene is contacted with a Lewis acid selected from the group consisting of mineral acids and the Friedel-Crafts catalysts enumerated according to claim 3.

5. The process of claim 1 wherein the organic compound starting materials are selected from the group consisting of allene, monomethyl allene, dimethyl allene, trimethyl allene, and tetramethyl allene.

6. The process of claim 1 wherein the organic compound starting material is allene.

7. The process of claim 1 wherein the Lewis acid is aluminum chloride.

8. A process for the production of polymers having molecular weights above 250, said process comprising contacting allene with a catalytic amount of aluminum chloride at a temperature of from about 100 to 200° C., at from about 150 to about 900 p.s.i.a. and for a period of from about 0.1 to about 10 hours wherein the polymer contains from about 1.0 to about 1.33 moles of hydrogen per mole of carbon.

9. The process of claim 8 wherein the starting organic compound comprises a stream of allene and methyl acetylene.

References Cited
UNITED STATES PATENTS

| | | | |
|---|---|---|---|
| 2,977,349 | 3/1961 | Brockway | 260—94.3 |
| 3,442,883 | 5/1969 | Shier | 260—94.3 |

JOSEPH L. SCHOFER, Primary Examiner

R. S. BENJAMIN, Assistant Examiner

U.S. Cl. X.R.

260—80.78, 82, 94.3, 94.4, 94.2, 680